Aug. 26, 1941. J. C. PATERSON 2,253,913
CONVEYER OF THE ENDLESS BAND TYPE
Filed Oct. 27, 1939

INVENTOR
JOHN CURRIE PATERSON
BY George B. Willcox
ATTORNEY

Patented Aug. 26, 1941

2,253,913

UNITED STATES PATENT OFFICE 2,253,913

CONVEYER OF THE ENDLESS BAND TYPE

John Currie Paterson, Peterborough, England, assignor to Baker Perkins, Inc., Saginaw, Mich., a corporation of New York Application October 27, 1939, Serial No. 301,541

3 Claims. (Cl. 198—182)

This invention relates to conveyers of the endless band type and has for its object the provision of conveying means adapted to change the direction of travel of the articles conveyed, or turn them through an arc, or convey them on a curved path. This application is a continuation-in-part of my copending United States application, Serial No. 232,224, filed September 28, 1938.

The invention consists in an improved framework conveying surface adapted for travel in an arcuate path.

Chains may be provided at the inner and outer margins of the conveying surface, being supported upon inner and outer guiding tracks or rails of arcuate form.

According to a further feature, transverse or radial members or spokes are provided between the inner and outer chains, surface elements of novel segmental form being located between said spokes. The segmental surface may consist of a plurality of elements such as coiled springs extending between the spokes.

This invention further provides a novel supporting and guiding assembly for conveyers operating to change the direction of travel of articles through arcs up to 180 degrees. This improved assembly is adapted for use either with the conveyer belt shown and described in the application of Edward D. Rapisarda for United States Patent, Serial No. 166,635, filed September 30, 1937, or with the conveyer belt of this application.

Figure 1:
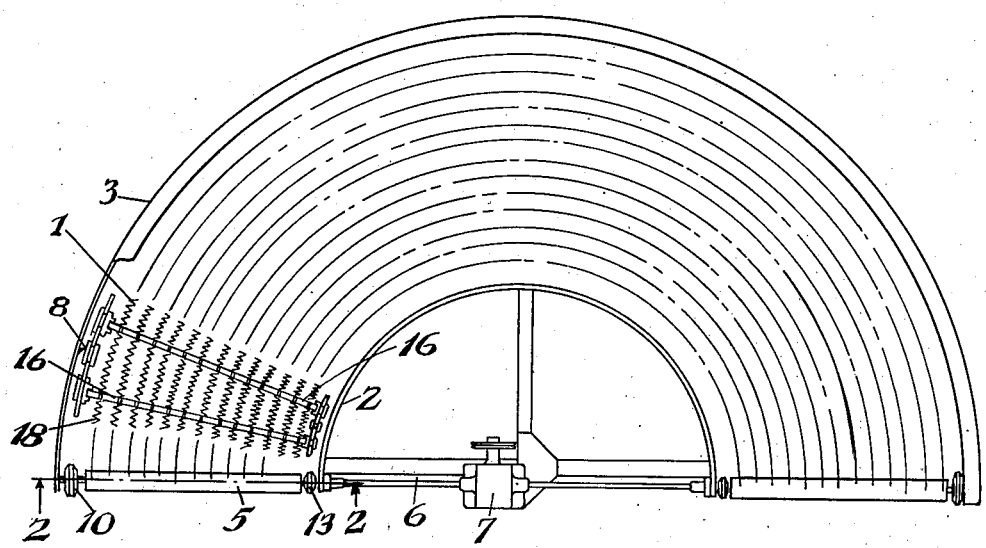
Figure 1 is a plan of an arcuate conveyer according to the invention.
Figure 2:
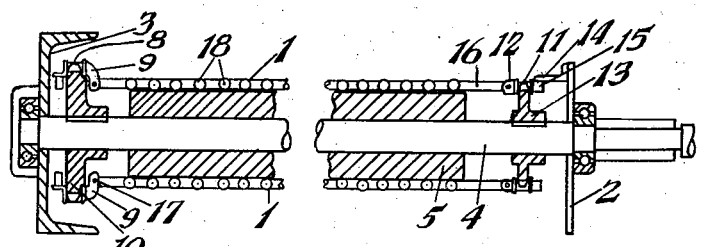
Figure 2 is a vertical cross-section corresponding to Figure 1, taken along line 2—2 of that figure.

Referring now to Figures 1 and 2 which illustrate a convenient way of constructing and supporting the conveyer of the invention, the conveyer band, indicated by the reference numeral 1, is mounted in a frame having an arcuate member or plate 2 at the inner edge of the band and an arcuate channel member 3 adjacent the outer edge.

At the upper and lower terminal points the band passes over a nosing. In the apparatus shown each nosing consists of a shaft 4 journaled at its ends in the members 2 and 3 carrying a cylindrical roller 5 which supports the band intermediate its edges. The shafts 4 are coupled to drive shafts 6 which are driven at suitable speeds by a geared transmission 7 from a suitable motor, not shown.

The conveyer band is driven from the shaft 5 by a circumferential driving chain 8 attached to the outer edge of the conveyer band. The chain is of known roller type articulated vertically and horizontally to enable it to travel around the outer arc of the frame as well as around the nosing. The conveyer band 1 is supported from the chain 8 at spaced intervals by lugs 9.

Other details of the turn-table structure are fully described in the application for United States patent of Edward D. Rapisarda, Serial No. 166,635, filed September 30, 1937.

At each nosing the chain 8 passes over a driving sprocket 10 which is fixed to the shaft 4. The diameter of the sprocket 10 is greater than that of the nosing roller 5, being proportional to the diameter of the conveyer at its outer edge, while the roller diameter is proportional to the diameter of the inner edge of the conveyer.

The sprockets 10 thus determine the speed of travel of the chain 8 and of the outer edge of the conveyer band in the arcuate run, while the speed of the band over the nosing throughout its width is determined by the roller 5, in the instant apparatus being equal to the speed of the arcuately traveling inner edge of the band.

At the inner edge of the conveyer band a second chain 11 is secured by angle brackets 12 to the edge of the conveyer. This chain is adapted to run over a second sprocket 13 mounted on the shaft 4 and being of the same diameter as the rollers 5. Should it be desired to convey relatively heavy loads on the conveyer a guiding track 14 may be provided above the chain 11 and adapted to be engaged by idler rollers 15 supported upon elongated pintles of the chain, whereby tilting of the chain due to localized loads is prevented.

In the event of the inner chain 11 and sprocket 13 being dispensed with in some instances, the inner edge of the conveyer at the nosing may pass over an idler roll similar to the roller 5.

Figure 3:
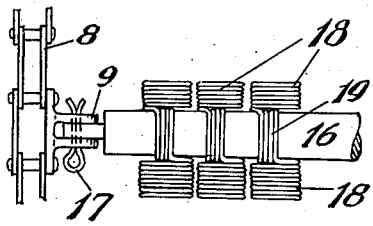
Figure 3 is a fragmentary plan of the improved coil-spring conveyer band.

Between chains 8 and 11 and secured thereto is a series of radially extending bars or spokes 16. The spokes at either end are pivotally connected to the chains by horizontal pintles 17 in lugs 9 (see Figure 3).

The spokes 16 together with the inner and outer chains 8, 11 thus form a series of truncated sectors, and these are filled in by a novel flexible supporting surface. This surface consists of a multiplicity of helical springs 18 which extend from spoke to spoke. The springs are spaced apart and are provided with loops 19 which embrace the spokes 16 so that the tops of the springs lie in the plane of the tops of the spokes (see Fig. 2).

The length of the springs 18 is such that they are normally under slight tension, there being in each space a series of springs of graduated lengths, as indicated in Figure 1.

The helical springs 18 may be kept in their spaced position by providing appropriate grooves or nicks in the spokes 16.

The cross-sectional shape of the springs 18 may be circular, square, flattened or of other form as desired.

Instead of closed springs 18 as above described, open springs may be employed, it being appreciated that the pitch of the helical coils in such case would be a normal one, and not produced by tensioning.

The conveyer band lies exceptionally flat in its working plane and is free from localized tendencies to binding which would tend to initiate warping and buckling. All tensions in the surface are exerted circumferentially, due to the stiff radial spokes 16, and tensions transmitted from the driving chains are not exerted through the mesh tangentially to the inner arc of the band, but are transmitted radially by the spokes. The circumferential tensions of the plurality of springs 18 have the same flattening effect over the entire width of the band as do the circumferentially threaded coil springs 22 shown in Fig. 6 of the Rapisarda application above referred to.

In operation, the outer edge of the conveying surface will change its speed as it passes from its planar run over the nosing roller 5 and vice versa. In the planar run the outer periphery travels at a rate faster than that of the inner periphery in proportion to the difference between the radii of their arcs of travel. Over the cylindrical nosing 5 their rates of travel will be the same, and the change in speed will produce a stretching or shortening of the coil springs 18.

The advantages of having this uniform rate of travel over the nosings, where goods are to be deposited or discharged, have been fully discussed in the Rapisarda application referred to above.

Having thus described my invention, what I claim and desire to secure by Letters Patent is:

1. A conveying device comprising an openwork endless band arranged for travel in a curved or semi-circular path between terminal cylindrical roller means of small diameter, said band comprising inner and outer chain elements connected by spaced radial spokes and resilient coiled springs extending between the spokes.

2. A conveying device as claimed in claim 1 having guiding chains along the lateral edges of the band, cylindrical terminal guiding means arranged to support the band so that its upper run travels through an arcuate path, sprockets mounted coaxially at each end of said cylindrical guiding means to receive the inner and outer chains and proportioned in diameter to the different speeds of their respective chains, and connections between the outer chain and the adjacent lateral edge of the band arranged to permit the chain and the edge of the band to travel through arcs of different diameters when the chain and band are passing respectively around said sprocket and cylindrical guiding means.

3. An endless band conveyer adapted for travel in its own plane in laterally curved paths wherein the lateral edges of the band move at different speeds, and around arcuate guiding means of uniform radius to change the plane of its travel; comprising spaced transverse spokes, closely spaced resilient coiled springs of small diameter extending between said spokes, a side chain, and means connecting said chain and spokes arranged to permit the chain and the band to travel through arcs of different diameters when the band passes around said arcuate guiding means.

JOHN CURRIE PATERSON.